United States Patent
Oroskar et al.

(12) 
(10) Patent No.: US 8,527,009 B1
(45) Date of Patent: Sep. 3, 2013

(54) INDICATING WIRELESS-SIGNAL STATUS ON A MOBILE DEVICE

(75) Inventors: Siddharth S. Oroskar, Overland Park, KS (US); Sachin R. Vargantwar, Overland Park, KS (US); Anoop Kumar Goyal, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 375 days.

(21) Appl. No.: 12/954,150

(22) Filed: Nov. 24, 2010

(51) Int. Cl.
*H04M 1/00* (2006.01)
(52) U.S. Cl.
USPC .......................................... 455/566; 455/423
(58) Field of Classification Search
USPC ................................ 455/432.1, 443, 513, 524
See application file for complete search history.

(56) References Cited

U.S. PATENT DOCUMENTS

| | | | |
|---|---|---|---|
| 7,761,119 B2 * | 7/2010 | Patel | 455/566 |
| 2004/0192290 A1 * | 9/2004 | Muthuswamy et al. | 455/425 |
| 2005/0208950 A1 * | 9/2005 | Hasse | 455/453 |

* cited by examiner

*Primary Examiner* — Tu X Nguyen

(57) ABSTRACT

Methods, systems, and computer-readable media are provided for presenting coverage bars on a mobile device based on available telecommunications signals. In particular, a mobile device is associated with a plurality of telecommunications signals. Further, the telecommunications signals associated with the mobile device are assessed based on signal strength. A determination is made as to the relative strength of one telecommunications technology over another. Additionally, identifiers of the telecommunications signals are presented on a screen of the mobile device.

15 Claims, 7 Drawing Sheets

INDICATING WIRELESS-SIGNAL STATUS ON A MOBILE DEVICE

SUMMARY

Embodiments of the invention are defined by the claims below, not this summary. A high-level overview of various aspects of the invention are provided here for that reason, to provide an overview of the disclosure, and to introduce a selection of concepts that are further described below in the Detailed Description section. This summary is not intended to identify key features or essential features of the claimed subject matter, nor is it intended to be used as an aid in isolation to determine the scope of the claimed subject matter.

As users of mobile devices have access to an increased number of telecommunications signals, it is becoming valuable to allow users to distinguish between available telecommunications technologies. Currently, mobile devices generally choose between available telecommunications signals, such as 3G/4G etc., WiMAX, EvDO, CDMA, GSM, GPRS etc., without user input. Further, current mobile devices do not distinguish technology choice by user preference. As users may find one form of telecommunications technology more efficient over another, it would be advantageous to provide users with knowledge of a plurality of telecommunications signals available to a mobile device.

In a first aspect, a set of computer-useable instructions provide a method of presenting indicators on a screen of a mobile device based on a plurality of telecommunications signals. The method comprises assessing signal strength of a plurality of telecommunications signals associated with the mobile device. The method also comprises displaying an identifier on the screen of the mobile device for each of the plurality of telecommunications signals. In particular, each identifier is based on assessing signal strength of the plurality of telecommunications signals. Additionally, a telecommunications signal of the plurality of telecommunications signals having the strongest signal strength is determined. Further, an auxiliary identifier associated with the telecommunications signal of the plurality of telecommunications signals with the greatest signal strength is displayed. The auxiliary identifier is based on assessing signal strength of the plurality of telecommunications signals.

In a second aspect, a set of computer-useable instructions provide a method of presenting indicators on a screen of a mobile device based on a plurality of telecommunications signals. The method comprises assessing signal strength of a plurality of telecommunications signals associated with the mobile device. The method also comprises displaying an identifier on the screen of the mobile device for each of the plurality of telecommunications signals based on assessing signal strength of the plurality of telecommunications signals. Additionally, the method comprises identifying a primary form of communication. Further, a telecommunications signal of the plurality of telecommunications signals that is most suited to the primary form of communication is determined. The method also comprises displaying an auxiliary identifier associated with the telecommunications signal of the plurality of telecommunications signals that is most suited to the primary form of communication.

In a third aspect, a set of computer-useable instructions provide a method of presenting indicators on a screen of a mobile device based on a plurality of telecommunications signals. The method comprises identifying a plurality of telecommunications signals associated with the mobile device. The method also comprises assessing signal strength of the plurality of telecommunications signals associated with the mobile device. Further, an identifier is displayed on the screen of the mobile device for each of the plurality of telecommunications signals based on assessing signal strength of the plurality of telecommunications signals. Additionally, a primary form of communication associated with the mobile device is identified. The method also comprises determining a subset plurality of telecommunications signals of the plurality of telecommunications signals that meet a threshold compatibility with the primary form of communication. Further, the method comprises displaying an auxiliary identifier associated with each telecommunications signal of the subset plurality of telecommunications signals that meets the threshold compatibility with the primary form of communication.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
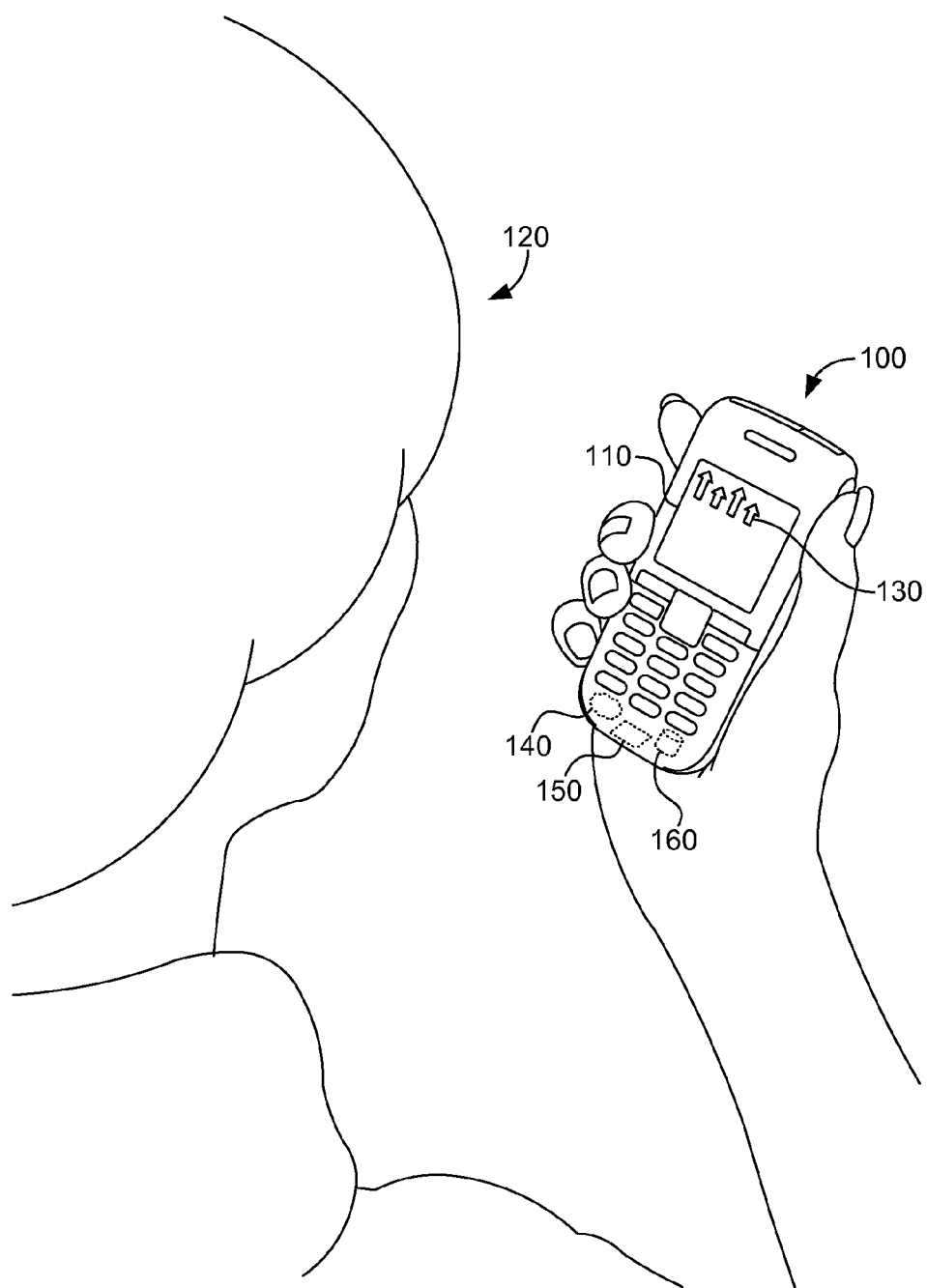
FIG. 1 depicts an illustrative mobile device depicting varying indicator signal strength of a plurality of telecommunications technologies, in accordance with an embodiment of the present invention.

The subject matter of embodiments of the present invention is described with specificity herein to meet statutory requirements. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| CD | Compact Disc |
| CDMA | Code Division Multiple Access |
| CD-ROM | Compact Disk Read Only Memory |
| DVD | Digital Versatile Discs |
| EEPROM | Electrically Erasable Programmable Read Only Memory |
| EvDO | Evolution-Data Optimized |
| GSM | Global System for Mobile Communications |
| LTE | Long Term Evolution |
| MP3 | MPEG-1 Audio Layer 3 |
| PC | Personal Computer |
| PDA | Personal Digital Assistant |
| RAM | Random Access Memory |
| ROM | Read Only Memory |
| WiMAX | Worldwide Interoperability for Microwave Access |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media include media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. Data can be stored on the media momentarily, temporarily, or permanently.

Embodiments of the present invention provide systems, methods, and computer-readable media for presenting indicators, such as coverage bars, on a screen of a mobile device based on a plurality of telecommunications signals. In particular, claimed embodiments of the present invention determine available telecommunications signals and present an indicator associated with each telecommunications signal on the screen of the mobile device. As described herein, telecommunications signals comprise technologies that enable telecommunications using mobile devices. Examples of telecommunications signals include WiMAX, LTE, 3G, 4G, EvDO, CDMA, and GSM. Accordingly, a mobile device may have coverage bars that are presented for each of a WiMAX signal, an EvDO signal, a CDMA signal, and an LTE signal when the telecommunications signals are available.

The coverage bars of available telecommunications signals may vary in height based on the signal strength of the telecommunications signals. As such, a first coverage bar representing CDMA signal strength may be higher than a second coverage bar representing EvDO signal strength when the CDMA signal strength is greater than the EvDO signal strength. Additionally, an auxiliary identifier may be presented in association with the coverage bar of the telecommunications signal having the greatest signal strength. Accordingly, in the example above, if the CDMA signal strength is greater than the other telecommunications signals associated with a mobile device, then the CDMA coverage bar may be emphasized using bold font, a shape-based identifier, or another form of auxiliary identifier.

Claimed embodiments of the present invention may also distinguish between telecommunications signals based on how compatible each signal is with forms of communication using mobile devices. For instance, some telecommunications signals are more compatible with voice communication, such as calling between mobile devices. Alternatively, some telecommunications signals are more compatible with data-based communication, such as text messaging. As such, when there is a user preference for telecommunications signals having a threshold of compatibility with voice communications, then a subset of available telecommunications signals associated with a mobile device may be assessed for signal strength. Further, the strongest signal strength of the subset of telecommunications signals may be presented with an auxiliary identifier.

Auxiliary identifiers may be used to recommend a particular telecommunications signal to a user of a mobile device. As such, when an auxiliary identifier is presented in association with a telecommunications signal, a user may select that telecommunications signal as the preferred telecommunications technology for communications facilitated using the mobile device. While auxiliary identifiers may be presented based on user preferences, they may also be presented based on network considerations, such as load balancing.

Based on signal strength, form of communication, and network considerations, a telecommunications technology may be best suited to facilitate a communication session of a mobile device. The choice of technology used may be made by the user of the mobile device. In particular, the user may assess the telecommunications signals available and determine the best technology for his desired application. Alternatively, a network may determine the best technology to use when facilitating communication sessions of a mobile phone.

For example, the network may access a user profile, such as a user profile stored in a subscription profile server (SPS), to determine the primary form of communication associated with a mobile device. Alternatively, an application on the mobile device may analyze usage of the mobile device to determine a primary form of communication. The determined primary form of communication may then be referenced when assessing a most suitable telecommunications signal.

As discussed above, a primary form of communication may comprise voice calling, texting, e-mail, etc. The network may also take the user preference in consideration when determining the telecommunications technology to choose for the mobile device. In particular, the network may use an algorithm based on load balancing across the network as well as user preference of communication when assigning a facilitating telecommunications technology to a mobile device.

Turning now to FIG. 1, an illustrative mobile device is provided in accordance with an embodiment of the present invention and referenced by the numeral 100. For brevity or as a shorthand form, this description might refer to a "device" instead of a "mobile device." This shorthand does not mean to imply a distinction with the different terms. In addition, a mobile device may refer to a number of different devices such as a cell phone or a PDA. This description does not intend to convey bright-line distinctions between the different types of mobile devices. Indeed, what one might refer to as a PDA, another might refer to as a mobile device or cell phone or even a PC.

Mobile device 100 may include a user interface 110, a user 120, telecommunications coverage bars 130, application 140, memory 150, and data structure 160. Generally, user interface 110 and icons 130 provide an input/output (I/O) interface that user 120 may engage to interact with device 100. For example, user interface 110 may include a touch screen that a user may scratch or touch to interact with device 100. This interaction may include selecting a telecommunications technology availability bar to display in the on user interface 110.

The mobile device 100 can be any computing device. In embodiments, mobile device 100 may be capable of web accessibility. Device 100 might take on a variety of forms, such as a personal computer (PC), a laptop computer, a mobile phone, a personal digital assistance (PDA), a CD player, an audio (e.g., MP3, etc.) player, a video player, a handheld communications device, a workstation, any combination of these devices, or any other mobile device, including a device that is capable of web accessibility. In one embodiment, device 100 is a mobile device that utilizes a wireless telecommunications network to communicate. Makers of illustrative mobile devices include, for example, Research in Motion®, Creative Technologies Corp., Samsung®, Apple® Computer, and the like. A mobile device can include, for example, a display(s), a power source(s) (e.g., a battery), a data store(s), a speaker(s), memory, a buffer(s), and the like.

Device 100 may also include application 140, memory 150, and data structure 160. Application 140 may carry out various functional aspects and might take on a variety of forms. For example, application 140 might include configuration settings, might facilitate communicating data between multiple devices, might handle updates, include user settings, etc. Specifically, application 140 may be used to implement a method for protecting the viewability of desired image portions presented on user interface 110 of mobile device 100. For example, application 140 may use computer software to recognize desired image portions and recognize facial structures.

Memory 150 may include a data structure 160 that stores and facilitates the operation of application 140. For example, memory 150 may store data relating to an image and/or information displayed on user interface 110, as well as information related to the selected image portions. In addition, memory 150 may store firmware and other various software modules and components that might be present in mobile device 100. These modules and components may be used in embodiments of the present invention to protect the viewability of desired image portions presented on mobile device 100. Other examples of illustrative software include things such as the operating system of a phone, third-party applications such as games, programs to watch television on the device, ring tones, location-based services, contact information, and the like. In sum, FIG. 1 is not meant to indicate all, or even major, systems or components of mobile device 100. An overview of mobile device 100 is presented and certain components are listed so as to be able to refer to them throughout this disclosure.

Figure 2:
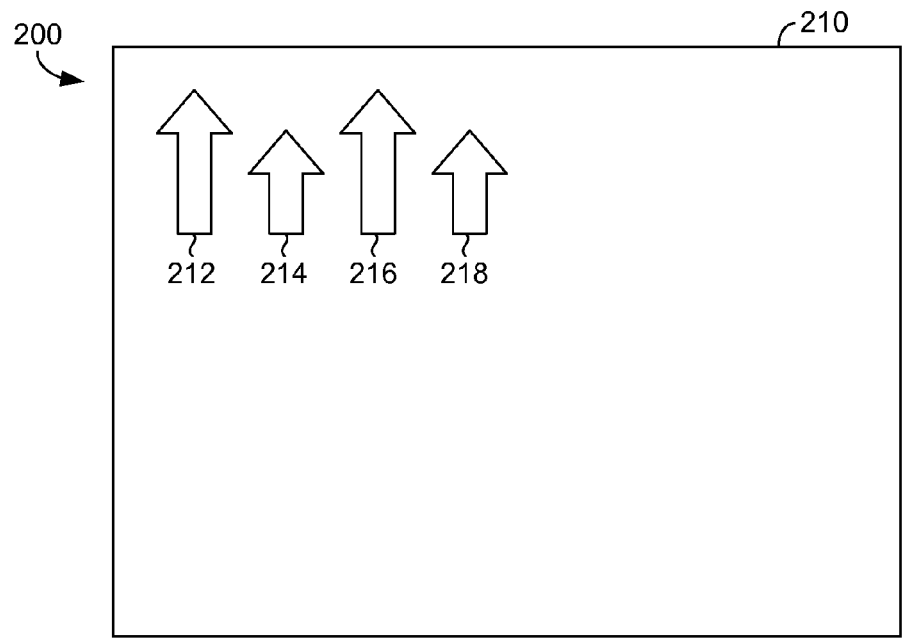
FIG. 2 depicts illustrative indicators on a screen of a mobile device based on telecommunications signals, in accordance with an embodiment of the present invention.

FIG. 2 depicts illustrative indicators 200 on a screen 210 of a mobile device based on telecommunications signals, in accordance with an embodiment of the present invention. Indicators 200 may be coverage bars. In particular, FIG. 2 illustrates coverage bars 212, 214, 216, and 218. As illustrated in FIG. 2, coverage bars 212, 214, 216, and 218 are each associated with a different telecommunications technology. For example, coverage bar 212 represents signal strength of WiMAX, coverage bar 214 represents signal strength of EvDO, coverage bar 216 represents signal strength of CDMA, and coverage bar 218 represents signal strength of LTE. As seen in FIG. 2, the height of coverage bars 212, 214, 216, and 218 corresponds to the signal strength of each telecommunications technology.

Coverage bars 212, 214, 216, and 218 may be distinguished based on color, emphasis, or placement on screen 210 of the mobile device. For instance, a color may be associated with a telecommunications technology. For example, WiMAX may as associated with a red coverage bar 212, EvDO may as associated with a blue coverage bar 214, CDMA may as associated with a yellow coverage bar 216, and LTE may as associated with a green coverage bar 214, Additionally, coverage bars 212, 214, 216, and 218 may be repositioned based on the telecommunications technology that has the strongest signal strength. For instance, the telecommunications signal that is strongest may be placed on the leftmost position of screen 210 of the mobile device. Based on the signal strength of telecommunications signals illustrated by coverage bars 212, 214, 216, and 218, a user of a mobile device may select an available telecommunications technology through which to conduct communication sessions using the mobile device.

Figure 3:
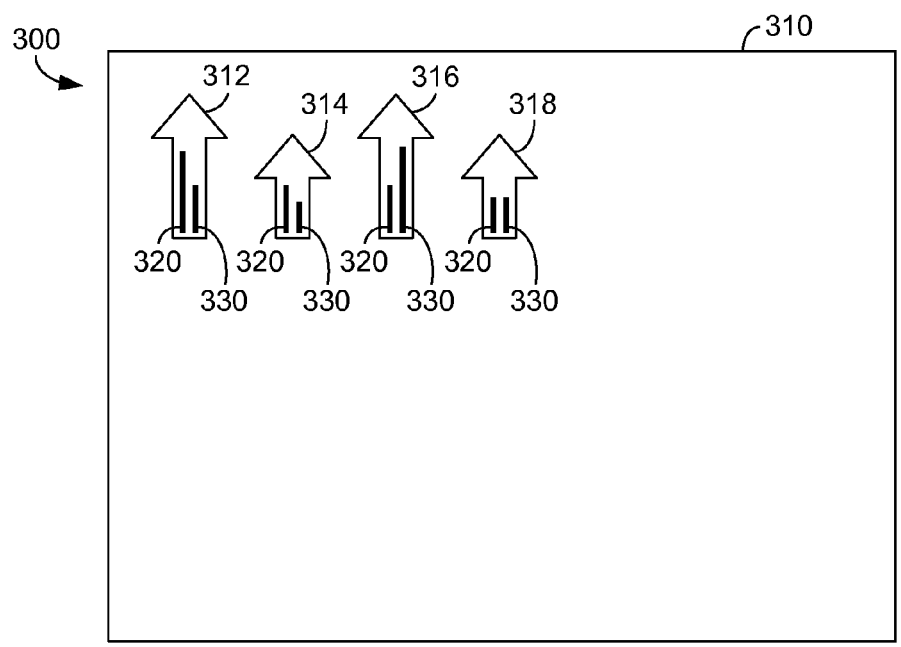
FIG. 3 depicts illustrative indicators on a screen of a mobile device having upload and download speeds of telecommunications signals, in accordance with an embodiment of the present invention.

In addition to illustrating signal strength of available telecommunications signals, coverage bars displayed on a screen of a mobile device may also illustrate the components of signal strength. Accordingly, FIG. 3 depicts illustrative indicators 300 on a screen 310 of a mobile device having upload and download speeds of telecommunications signals, in accordance with an embodiment of the present invention. Similarly to FIG. 2, indicators 300 may be coverage bars. In particular, coverage bar 312 represents signal strength of WiMAX, coverage bar 314 represents signal strength of EvDO, coverage bar 316 represents signal strength of CDMA, and coverage bar 318 represents signal strength of LTE.

Additionally, the height of coverage bars 312, 314, 316, and 318 corresponds to the signal strength of each telecommunications technology. Further, each of coverage bars 312, 314, 316, and 318 has an upload 320 and download 330 indicator. In particular, upload 320 and download 330 indicators illustrate the component of the overall signal strength (as indicated by height) that is found in upload signal strength and download signal strength. Accordingly, a user of a mobile device may choose a telecommunications signal based on the relative upload (or download) strength of each telecommunications technology available rather than looking only at the overall signal strength each telecommunications signal.

Figure 4:
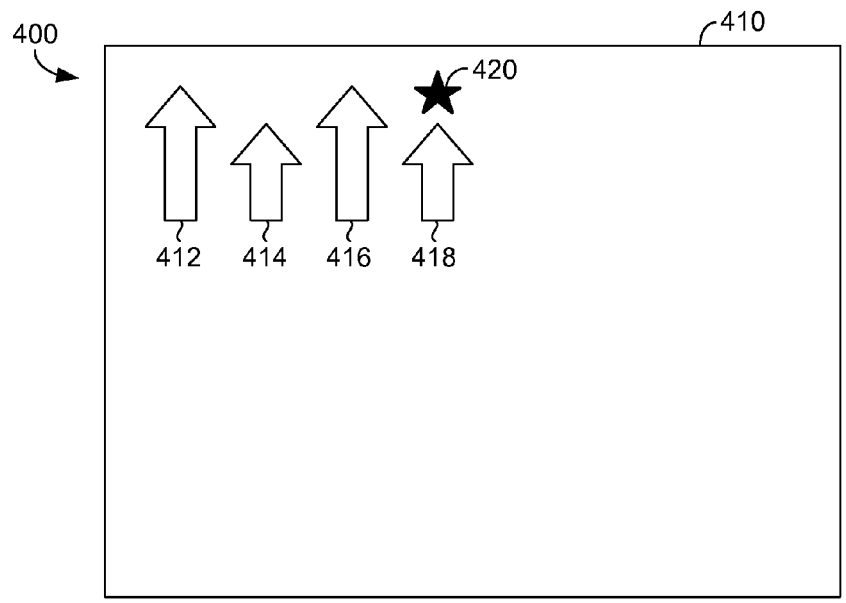
FIG. 4 depicts illustrative indicators on a screen of a mobile device based on assessed strength of telecommunications signals, in accordance with an embodiment of the present invention.

FIG. 4 depicts illustrative indicators 400 on a screen 410 of a mobile device based on assessed strength of telecommunications signals, in accordance with an embodiment of the present invention. Indicators 400 may be coverage bars. In particular, FIG. 4 illustrates coverage bars 412, 414, 416, and 418. Similarly to FIG. 2, coverage bar 412 represents signal strength of WiMAX, coverage bar 414 represents signal strength of EvDO, coverage bar 416 represents signal strength of CDMA, and coverage bar 418 represents signal strength of LTE. Additionally, FIG. 4 illustrates an auxiliary identifier 420. In particular, auxiliary identifier may be used to indicate the coverage bar associated with the telecommunications signal that is best suited for communications with the mobile device. As discussed above, the telecommunications signal that is best suited for communications may be based on a number of factors, including primary form of communication, overall signal strength, and upload/download speeds.

Figure 5:
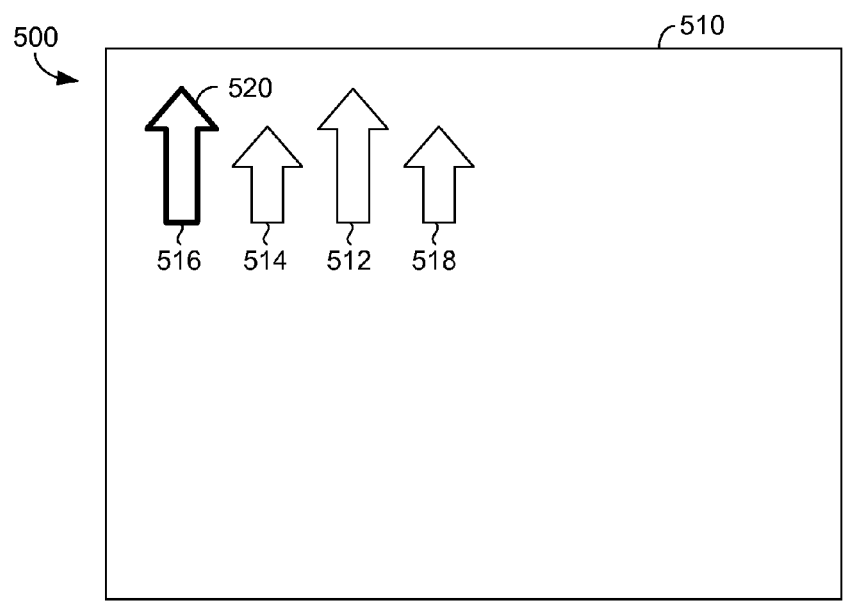
FIG. 5 depicts illustrative indicators on a screen of a mobile device based on assessed strength of telecommunications signals and user preferences, in accordance with an embodiment of the present invention.

In addition to providing a shape-based auxiliary identifier as seen in FIG. 4, a positional auxiliary identifier may also be provided. Accordingly, FIG. 5 depicts illustrative indicators 500 on a screen of a mobile device based on assessed strength of telecommunications signals and user preferences, in accordance with an embodiment of the present invention. Indicators 500 may be coverage bars. In particular, FIG. 5 illustrates coverage bars 512, 514, 516, and 518. Similarly to FIG. 2, coverage bar 512 represents signal strength of WiMAX, coverage bar 514 represents signal strength of EvDO, coverage bar 516 represents signal strength of CDMA, and coverage bar 518 represents signal strength of LTE. Additionally, FIG. 5 illustrates use of a positional identifier 520 that places a preferred telecommunications signal to the far-left portion of screen 510. While recommended telecommunications signal 516 has also been emboldened, the font-based identifier is not necessarily required. However, each of coverage bars 512, 514, 516, and 518 may be colored to distinguish between telecommunications technologies.

Figure 6:
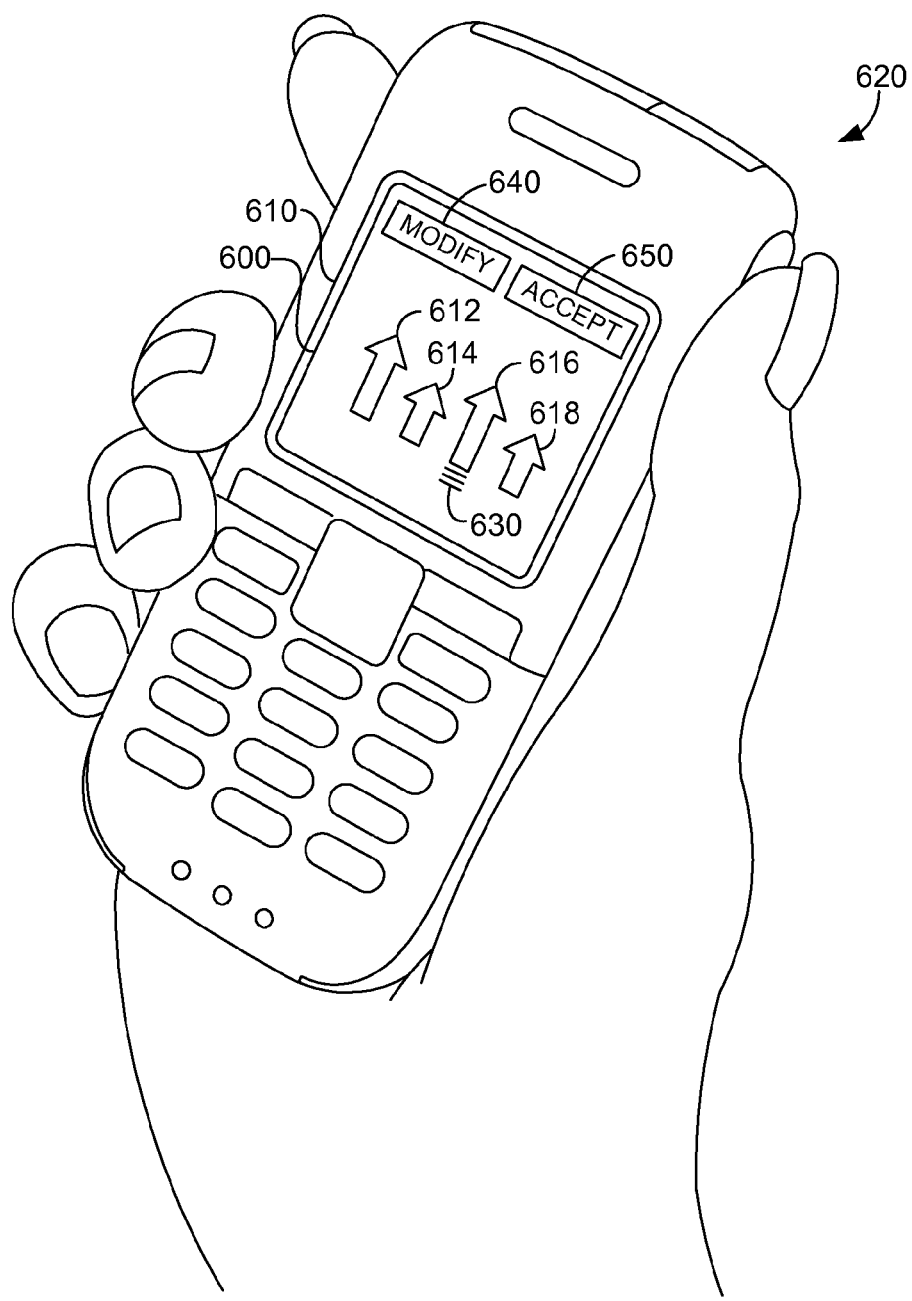
FIG. 6 depicts an illustrative user interface presented on a screen of mobile device, in accordance with an embodiment of the present invention.

As discussed above, a user may assess the telecommunications signals to choose an available telecommunications technology to use when facilitating communication using a mobile device. FIG. 6 depicts an illustrative user interface 600 presented on a screen 610 of mobile device, in accordance with an embodiment of the present invention. In particular, FIG. 6 illustrates an interface 600 on screen 610 of mobile device 620. Interface 600 comprises coverage bars 612, 614, 616, and 618. Additionally, interface 600 comprises a selection 630 of coverage bar 616. In particular, the telecommunications signal associated with coverage bar 616 is selected to be used in facilitating communication sessions with mobile device 620. Further, modify 640 and accept 650 buttons are provided for a user to use in interacting with interface 600.

Figure 7:
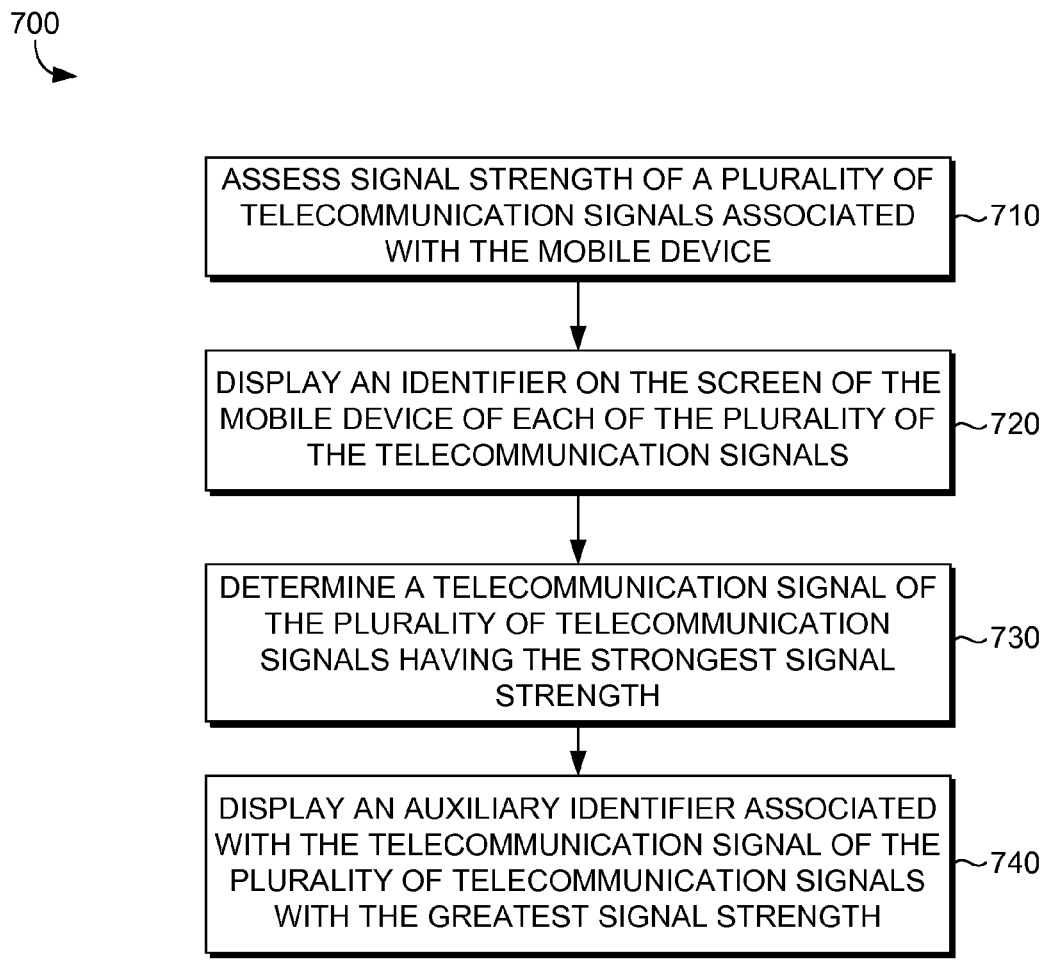
FIG. 7 is a flow diagram showing an embodiment of a method of presenting indicators on a screen of a mobile device based on a plurality of telecommunications signals, in accordance with an embodiment of the present invention.

FIG. 7 is a flow diagram 700 showing an embodiment of a method of presenting indicators on a screen of a mobile device based on a plurality of telecommunications signals, in accordance with an embodiment of the present invention. At step 710, signal strength of a plurality of telecommunications signals associated with the mobile device is assessed. At step 720, an identifier is displayed on the screen of the mobile device for each of the plurality of telecommunications signals based on assessing signal strength of the plurality of telecommunications signals. Each identifier of the plurality of telecommunications signals may be varied based on appearance.

At step 730, a telecommunications signal of the plurality of telecommunications signals having the strongest signal strength is determined. At step 740, an auxiliary identifier associated with the telecommunications signal of the plurality of telecommunications signals with the greatest signal strength based on assessing signal strength of the plurality of telecommunications signals is displayed. The auxiliary identifier may be based on placement of the plurality of telecommunications signals. Alternatively, the auxiliary identifier may be based on at least one of shape, pattern, and font. Further, a telecommunications signal of the plurality of telecommunications signals may be chosen to transmit communications using the mobile device. In particular, telecommunications signal that has the greatest signal strength may be chosen to transmit communications using the mobile device. The telecommunications signal may be chosen by a user. Alternatively, the telecommunications signal may be chosen by a network.

Figure 8:
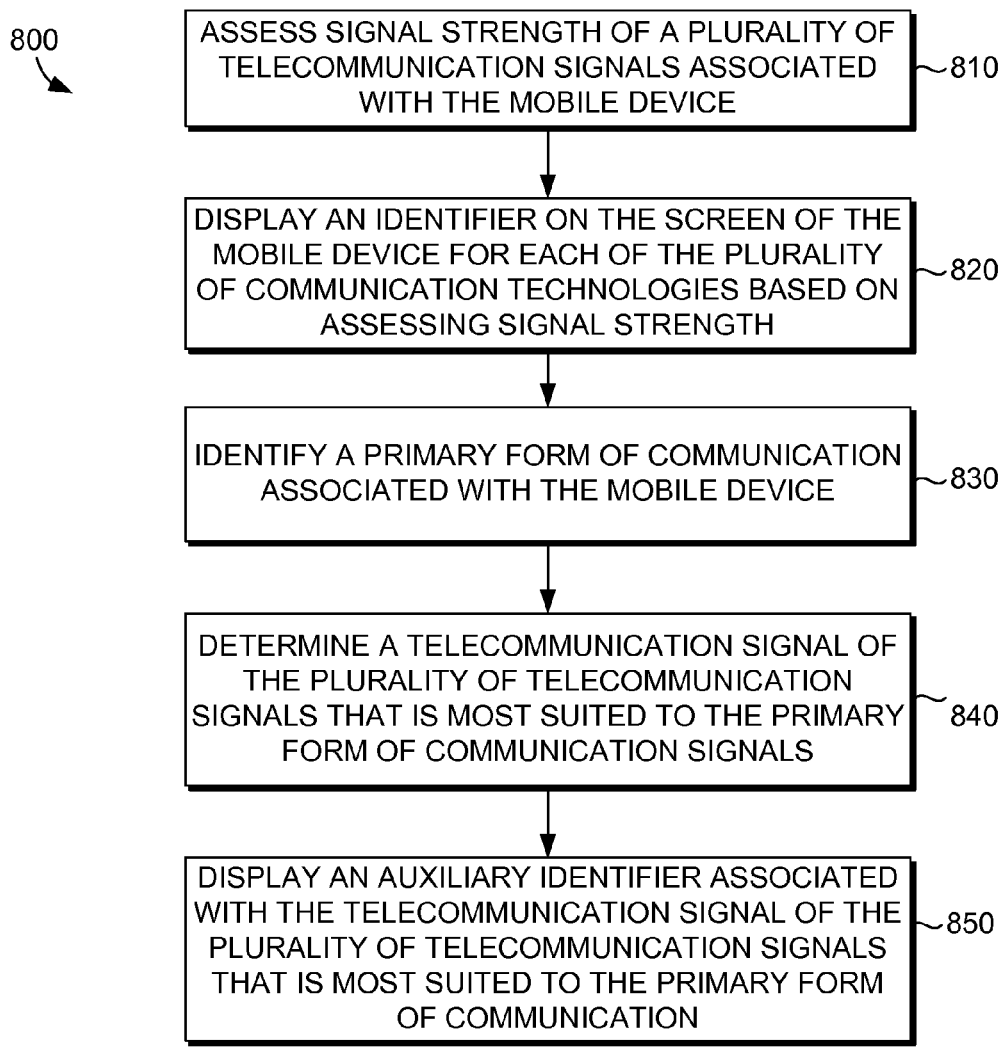
FIG. 8 is another flow diagram showing an embodiment of a method of presenting indicators on a screen of a mobile device based on a plurality of telecommunications signals, in accordance with an embodiment of the present invention.

FIG. 8 is another flow diagram 800 showing an embodiment of a method of presenting indicators on a screen of a mobile device based on a plurality of telecommunications signals, in accordance with an embodiment of the present invention. At step 810, signal strength of a plurality of telecommunications signals associated with the mobile device is assessed. At step 820, an identifier is displayed on the screen of the mobile device for each of the plurality of telecommunications signals based on assessing signal strength of the plurality of telecommunications signals. Each identifier of the plurality of telecommunications signals may be varied based on appearance.

At step 830, a primary form of communication is identified. The primary form of communication may be based on user usage, user preference, or a combination of the two. For example, the primary form of communication may be voice, texting, e-mail. At step 840, a telecommunications signal of the plurality of telecommunications signals that is most suited to the primary form of communication is determined. At step 850, an auxiliary identifier associated with the telecommunications signal of the plurality of telecommunications signals that is most suited to the primary form of communication is displayed.

Further, a telecommunications signal of the plurality of telecommunications signals may be chosen to transmit communications using the mobile device. In particular, telecommunications signal that is most suited to the primary form of communication may be chosen to transmit communications using the mobile device. The telecommunications signal may be chosen by a user. Alternatively, the telecommunications signal may be chosen by a network.

Figure 9:
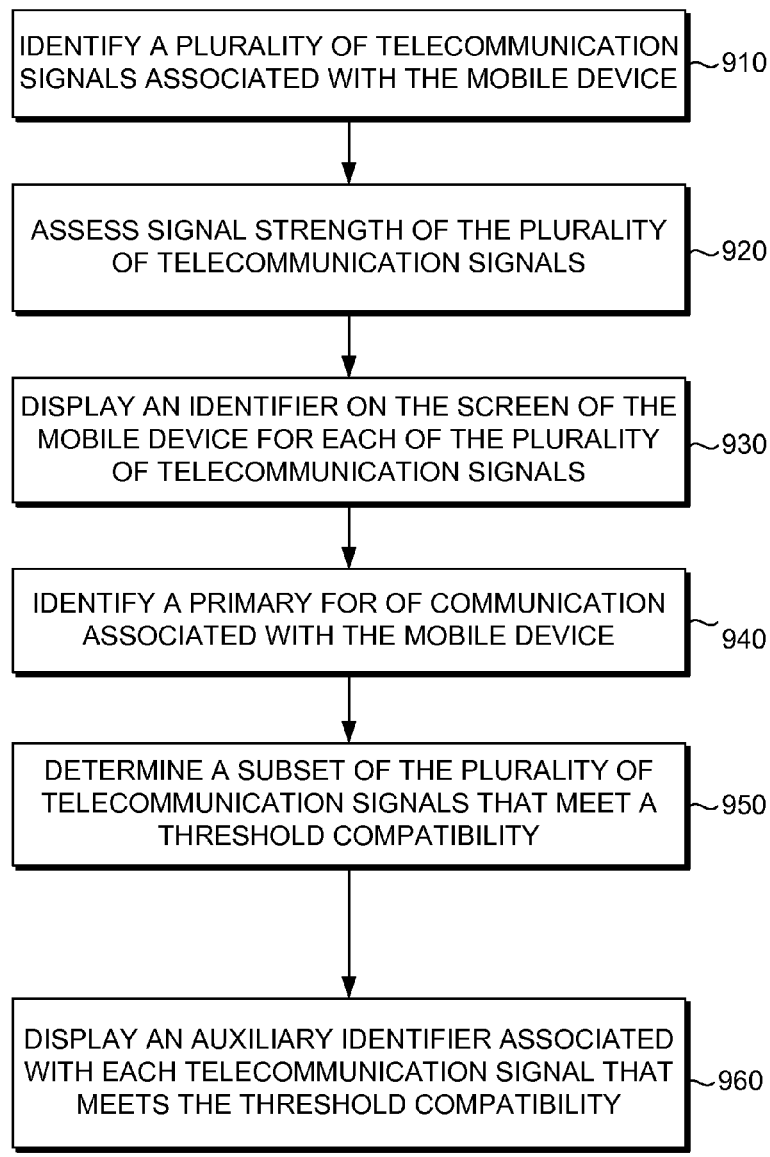
FIG. 9 is a further flow diagram showing an embodiment of a method of presenting indicators on a screen of a mobile device based on a plurality of telecommunications signals, in accordance with an embodiment of the present invention.

FIG. 9 is a further flow diagram 900 showing an embodiment of a method of presenting indicators on a screen of a mobile device based on a plurality of telecommunications signals, in accordance with an embodiment of the present invention. As indicated at step 910, a plurality of telecommunications signals associated with the mobile device is identified. At step 920, signal strength of the plurality of telecommunications signals associated with the mobile device is assessed. At step 930, an identifier is displayed on the screen of the mobile device for each of the plurality of telecommunications signals based on assessing signal strength of the plurality of telecommunications signals. Each identifier of the plurality of telecommunications signals may be varied based on appearance.

At step 940, identifying a primary form of communication associated with the mobile device is identified. At step 950, determining a subset plurality of telecommunications signals of the plurality of telecommunications signals that meet a threshold compatibility with the primary form of communication is determined. At step 960, an auxiliary identifier associated with each telecommunications signal of the subset plurality of telecommunications signals that meets the threshold compatibility with the primary form of communication is displayed. Further, a telecommunications signal of the plurality of telecommunications signals may be chosen to transmit communications using the mobile device. In particular, telecommunications signal having the strongest signal and that meets the threshold compatibility with the primary form of communication may be chosen to transmit communications using the mobile device. The telecommunications signal may be chosen by a user. Alternatively, the telecommunications signal may be chosen by a network.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Computer-readable media ("media") having computer-executable instructions embodied thereon that, when executed, facilitate a method of presenting indicators on a screen of a mobile device based on a plurality of telecommunications signals, the method comprising:
assessing signal strength of a plurality of telecommunications signals associated with the mobile device;
displaying an identifier on the screen of the mobile device for each of the plurality of telecommunications signals based on assessing signal strength of the plurality of telecommunications signals;
identifying a primary form of communication, wherein the primary form of communication is e-mail;
determining a telecommunications signal of the plurality of telecommunications signals that is most suited to the primary form of communication; and
displaying an auxiliary identifier associated with the telecommunications signal of the plurality of telecommunications signals that is most suited to the primary form of communication.

2. The media of claim 1, wherein each identifier of the plurality of telecommunications signals is varied based on appearance.

3. The media of claim 1, wherein the auxiliary identifier is based on placement of the plurality of telecommunications signals.

4. The media of claim 1, further comprising:
choosing to use the telecommunications signal of the plurality of telecommunications signals with the primary form of communication.

5. The media of claim 4, wherein the user chooses to use the telecommunications signal.

6. The media of claim 4, wherein the network chooses to use the telecommunications signal.

7. The media of claim 5, wherein the auxiliary identifier is based on at least one of shape, pattern, and font.

8. Computer-readable media ("media") having computer-executable instructions embodied thereon that, when executed, facilitate a method of presenting indicators on a screen of a mobile device based on a plurality of telecommunications signals, the method comprising:
assessing signal strength of a plurality of telecommunications signals associated with the mobile device;
displaying an identifier on the screen of the mobile device for each of the plurality of telecommunications signals based on assessing signal strength of the plurality of telecommunications signals;
identifying a primary form of communication, wherein the primary form of communication is texting;
determining a telecommunications signal of the plurality of telecommunications signals that is most suited to the primary form of communication; and
displaying an auxiliary identifier associated with the telecommunications signal of the plurality of telecommunications signals that is most suited to the primary form of communication.

9. The media of claim 8, further comprising:
choosing to use the telecommunications signal that is most suited to the primary form of communication to transmit communications using the mobile device.

10. The media of claim 9, wherein the user chooses to use the telecommunications signal.

11. The media of claim 9, wherein the network chooses to use the telecommunications signal.

12. Computer-readable media ("media") having computer-executable instructions embodied thereon that, when executed, facilitate a method of presenting indicators on a screen of a mobile device based on a plurality of telecommunications signals, the method comprising:
identifying a plurality of telecommunications signals associated with the mobile device
assessing signal strength of the plurality of telecommunications signals associated with the mobile device;
displaying an identifier on the screen of the mobile device for each of the plurality of telecommunications signals based on assessing signal strength of the plurality of telecommunications signals;
identifying a primary form of communication associated with the mobile device, wherein the primary form of communication is texting or email;
determining a subset plurality of telecommunications signals of the plurality of telecommunications signals that meet a threshold compatibility with the primary form of communication; and
displaying an auxiliary identifier associated with each telecommunications signal of the subset plurality of telecommunications signals that meets the threshold compatibility with the primary form of communication.

13. The media of claim 12, further comprising:
choosing to use the telecommunications signal that is most suited to the primary form of communication and that meets the threshold compatibility with the primary form of communication to transmit communications using the mobile device.

14. The media of claim 13, wherein the telecommunications signal is chosen by the user.

15. The media of claim 13, wherein the telecommunications signal is chosen by the network.

* * * * *